US008112029B1

(12) United States Patent
Marroquin et al.

(10) Patent No.: US 8,112,029 B1
(45) Date of Patent: Feb. 7, 2012

(54) METHOD FOR DEVELOPING WRITING SKILLS BY CREATING CUSTOMIZED BOOKS USING A NETWORK

(75) Inventors: Alfredo Marroquin, McAllen, TX (US); Mateo Salazar, Sr., Mission, TX (US)

(73) Assignee: Little Green Apples, Inc., McAllen, TX (US)

( * ) Notice: Subject to any disclaimer, the term of this patent is extended or adjusted under 35 U.S.C. 154(b) by 1076 days.

(21) Appl. No.: 11/862,610

(22) Filed: Sep. 27, 2007

(51) Int. Cl.
*G09B 5/00* (2006.01)

(52) U.S. Cl. ...................................................... 434/317

(58) Field of Classification Search .................. 434/322, 434/323, 350, 365, 81, 317
See application file for complete search history.

(56) References Cited

U.S. PATENT DOCUMENTS

| | | | | |
|---|---|---|---|---|
| 5,799,157 | A * | 8/1998 | Escallon | 705/27 |
| 7,020,663 | B2 * | 3/2006 | Hay et al. | 434/317 |
| 2002/0083101 | A1 * | 6/2002 | Card et al. | 707/526 |
| 2003/0144961 | A1 * | 7/2003 | Tharaken et al. | 705/57 |
| 2007/0256011 | A1 * | 11/2007 | Jones | 715/523 |
| 2008/0189609 | A1 * | 8/2008 | Larson et al. | 715/273 |

OTHER PUBLICATIONS

Business Editors. Business Wire—Hungry Minds Launches 'Hungry Minds a la Carte' on Mar. 19, 2001. New York: pp. 1-2.*
Business Editors. Business Wire—Kluwer's New Platform Offers Customized Book Content Online. New York: Sep. 12, 2002. pp. 1-2.*
PR Newswire. Blurb Inc., Announces Public Availability of Populist Publishing Service; Highly Anticipated Book Publishing Software Democratizes Publishing. New York: May 3, 2006. pp. 1-2.*

* cited by examiner

*Primary Examiner* — Kesha Y. Frisby
(74) *Attorney, Agent, or Firm* — Buskop Law Group, PC; Wendy Buskop

(57) ABSTRACT

A method for creating a book using a network, comprising using a processor to create a website to entice a user to become a subscriber. Computer instructions are used to provide a welcome message, provide a security feature to the user, provide a free tour of the service for creating the book, and offer a search tool to browse a dynamic information database containing artwork, text, characters, contact information for artists and authors to provide commissioned work, and rules of usage. The computer instructions also offer viewing of artwork having high viewing frequency, provide a payment selection to become a subscriber, and process payment by the user. A subscriber is then allowed to create a unique book, store selections and work under an account having a secure account number, and print at least a portion of the unique book on a printer owned, controlled, or designated by the subscriber.

20 Claims, 4 Drawing Sheets

| Welcome to _____. We are an online self-publishing site for authors and artists. Authors may share, illustrate their work, print it in book form, and solicit authorship opportunity. Artists may compose/display their work or look for illustration opportunities. | ~14 |

Search: [LITERARY WORKS]~20  [VISUAL WORKS]~18  ~16

Most Viewed: [The Red Pony]~24a  
[The Magic Wand]~24b  [The Girl]~24c  
~26a  ~26b  ~26c  
~22

New Uploads: [3 Little Pigs]~30a  
[My Story]~30b  [The Sky]~30c  
~32a  ~32b  ~32c  
~28

Members Log In ~34

User Name: [_____]~36

Password: [_____]~38

Remember Me: ☐~40

[REGISTER TODAY]~42

[Forgot my password]~44

Refer a friend: [_____]~46

[FREE TOUR]~48

[ADD TO FAVORITES]~50

ONLINE ADS ~52

Figure 1

METHOD FOR DEVELOPING WRITING SKILLS BY CREATING CUSTOMIZED BOOKS USING A NETWORK

FIELD

The present embodiments relate to a method for creating a book having at least one story using a network, such as a world wide network.

BACKGROUND

A need exists for encouraging writing in children who are prone to play games on the internet and otherwise fail to use computers in a manner that promotes development of useful skills.

A further need exists for capturing quickly and easily, the writings of consultants and others, and combining those writings with preexisting clip art, or with commissioned art, quickly and easily creating a formatted book for printing on a home computer.

The present embodiments meet these needs by presenting a subscription service which enables individuals to create and print books with stories, characters, and art combinations unique to the writer.

BRIEF DESCRIPTION OF THE DRAWINGS

The detailed description will be better understood in conjunction with the accompanying drawings as follows:

FIG. 1 depicts a welcome page for the website viewable by subscribers of the customized book writing service.

Figure 2:
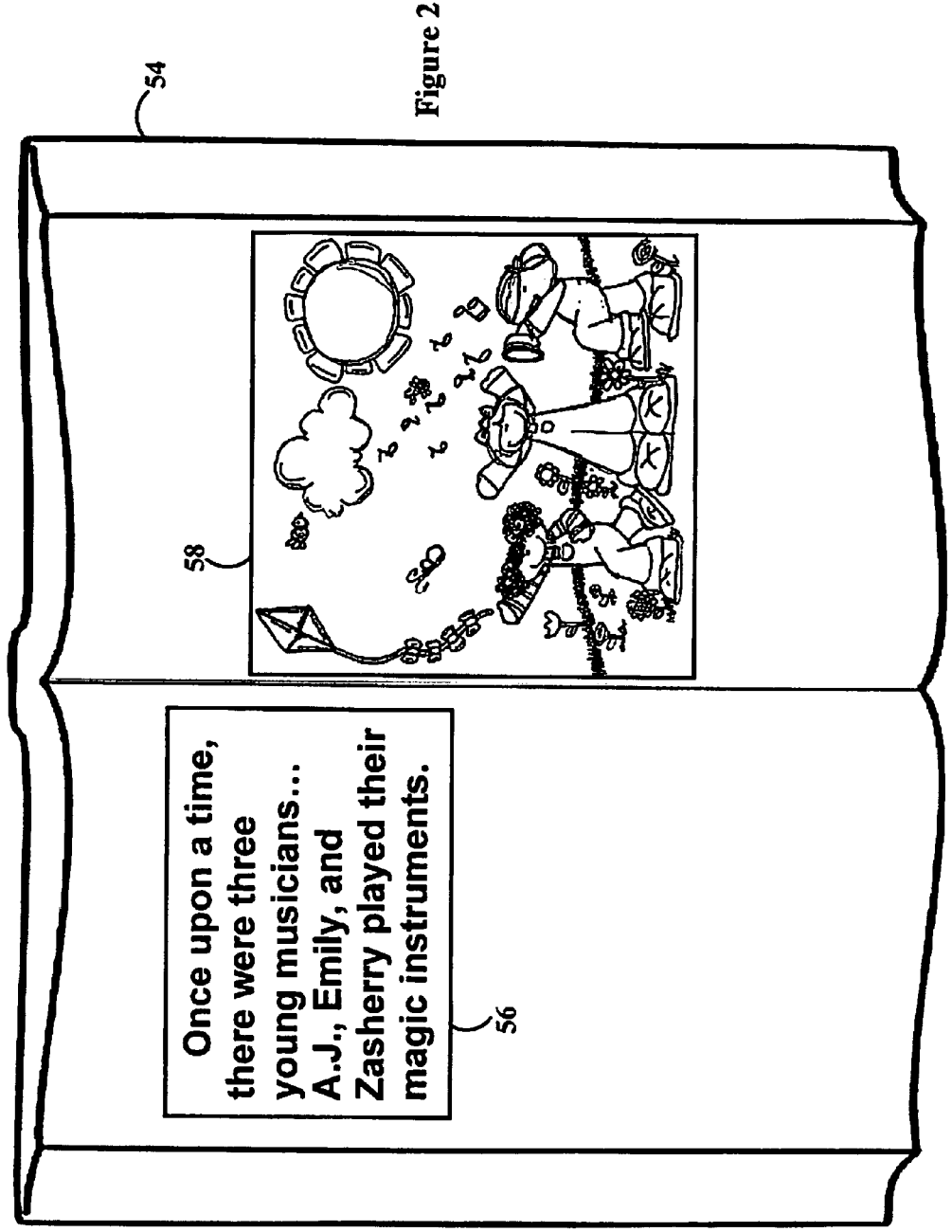
FIG. 2 depicts a page from a created unique customized book using the subscribe services.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a method for creating a book having at least one story using a network. The present method contemplates providing access to story writing and book creation services to subscribers.

The present method advantageously allows any individual to quickly and easily produce a formatted, printable, customized unique book, containing text and artwork, of an author's choosing. Using the present method, a young child in need of improving his or her writing skills can produce unique books, having a wide variety of customized or preexisting text and images, in a fun and entertaining manner. Also using the present method, a corporate executive in need of providing textual and graphic information in the form of a formatted book can produced customized books containing all necessary information, incorporating preexisting and specially commissioned text and images.

The present method further provides the benefit of creating formatted books that can be printed by a user of the present method, using a home printer or similar device. Typically, to produce a book, a publisher must be located, requiring substantial time and incurring large costs. The present method allows a user to generate unique books without requiring the services of a professional publisher.

The present method contemplates using a processor in communication with data storage and a network, such as a server having a processor and data storage in communication with the internet. Useable networks can also include fiber optic networks, satellite networks, cellular networks, plain old telephone system networks, wide area networks, local area networks, or combinations thereof.

The data storage includes a dynamic information database that can be continually accessed and continually updated 24 hours a day, 7 days a week.

The dynamic information database stores artwork and text from an administrator, artwork and text from one or more subscribers, artwork and text from third parties for use by one or more subscribers, as well as preexisting artwork and text. Artwork can include clip art, stock photographs, stock artwork, commissioned works of art, and combinations thereof. The dynamic information database can also store contract templates for use in commissioning writers, artists, or combinations thereof.

The data storage also contains computer instructions for instructing the processor to present the story writing services to viewers of a website over one or more networks, collect payment, and facilitate the story writing process.

More specifically, computer instructions in the data storage enable the website to present a welcome message to one or more users, simultaneously, that are interested in creating a customized book.

The welcome page can include information about the services provided and can permit users to log in through a security feature, such as a secure, encrypted log in identity with a password, if the user is a subscriber.

If the user is not yet a subscriber, the welcome page can offer a free tour of the writing services for viewing by a user, before asking for payment from the user to become a subscriber of the services. Payment selection can be collected from a user by offering icons to pay for the service using one or more credit cards, debit cards, a Paypal™ account, or a similar networked payment system.

The free tour can be provided using computer instructions to present to the user viewing the website an outline of a book with a defined group of pages. Next, the computer instructions can automatically generate text on at least one page of the defined group of pages. For example, the outline of the book can be the outline of a small black book with white edges, and a few pages located between the covers. The text that can automatically appear might be:

"Under a large tree in the country, Emily was sitting looking at a very dull book that her history teacher had given her to read. She could only turn the pages over and over hoping to be surprised by a painting of a queen or a tea party or anything of value. When quite suddenly, a large white rabbit with pink eyes hopped right by the tree. Now if you are sitting in the country as quietly as Emily was, you shouldn't be surprised to see a rabbit go jumping by, but this rabbit had on a small vest and a hat, and Emily distinctly thought she heard him say . . . . "

Once the text starts to appear, contextual background artwork can simultaneously appear behind or adjacent the text. For example, in the above story, artwork of a large tree might appear, with clouds and a blue sky, and perhaps green grass.

Next, a visual image of one or more of the characters mentioned in the text can appear. For example, in the above story, a character of a girl that is a student and a rabbit with vest and hat can appear. In an embodiment, the characters in the related text or story can be animated. The hair color, eye color, and fabric choices and colors of the clothing can be pre-selected by the administrator of the website for the purposes of the tour, but once a user has become a subscriber, it is contemplated that the subscriber can custom write text, hire a pre-contracted writer to write text, create custom background artwork and/or characters, or hire an artist offering contract services to subscribers to create the background art and the characters. Similarly, the subscriber can hire an animator pre-contracted by the administrator of the website, through the website, to animate one or more characters if the book is to remain an electronic book. A subscriber can also animate one or more characters without the assistance of an animator. If the book is not to remain an electronic book, but become a printed book, the characters may not be animated.

It is further contemplated that subscribers can be contracted to provide artwork, text, and animation to other subscribers, performing the same functions as pre-contracted artists, authors, and animators. Subscribers can also store any produced artwork, text, or animation and make this work publicly available in the dynamic information database, accessible and useable by other subscribers.

Icons can be presented to subscribers offering use of artwork, text, or combinations thereof posted by one or more other subscribers, or one or more pre-contracted authors, artists, or animators.

It is contemplated that the website would offer a variety of characters, such as Emily, Alfredo, and others for use by subscribers with their stories. It is also contemplated that subscribers can create their own customized characters.

Next, a title would appear on the front page of the outline of the book. In the case of the above story, the title can be, "Emily and the Silly Rabbit." The Title might again repeat on or near the first page of the book during the free tour. Once the viewer/user becomes a subscriber, the subscriber can create a customized title or possibly select pre-created titles from a listing offered by the website.

In addition to the free tour, it is contemplated that the website can offer a search option to a user to browse a series of categories, each containing artwork stored in the dynamic information database, text already saved and available for use by subscribers in the dynamic information database, characters for use by subscribers, and some information to demonstrate to the user that one or more artists can be engaged to provide commissioned works, such as background art, characters, or cover art for insertion in the subscriber's unique book. Similarly, the search feature can allow users to view some information on authors contracted by the website for subscriber use to provide commissioned text work for use in books of the subscribers. The search feature can also enable users to view the rules of usage for the browsed artwork, text, characters, and contact information when creating custom books online using the network.

It is contemplated that as a "tease" to entice users to become subscribers, computer instructions in the data storage can instruct the processor to present to one or more users, simultaneously, one or more elements of artwork, text, characters, or combinations thereof, that have a high viewing frequency by recent users of the website.

In an embodiment, it is contemplated that a user can be allowed to "test" the website and create three pages of a book using existing art, and user created text, thereby enabling a user to test the ease in which the user can create the customizable book.

The user can also be presented with a payment option to become a subscriber. Subscribers can then create one or more customized books during a subscription period.

The user can also be presented with information on rules of being a subscriber, using computer instructions in data storage associated with the processor. The rules would include the subscription time period based on the fee payment made, commercial use terms of the customized book, terms on use of commissioned text, artwork, or characters of the authors and artists associated with the website, and access to form contracts required to become a subscriber to the book writing services.

The user can become a subscriber by completing an electronic form containing the user's name, address, phone number, email address, date of birth, form of payment, and ability to contract for services. Minors, such as children under 18 years of age, would require authorization by a guardian or parent to make the service contract binding. However, it is contemplated that minors can greatly enjoy use of the services provided by the present method, and that creation of electronic books and corresponding printed books would be a significant asset when applying for college, enabling students to distinguish themselves by presenting publications of their own literature to difficult and high caliber admissions offices.

It is contemplated that payment presented by the user via the form on the website can be made by a credit card, a debit card, or another electronic payment service, such as Pay Pal™, by submitting account information and PIN codes, billing information, and related information using the processor connected to the network, thereby enabling the user to become a subscriber.

The user can also have to electronically accept a contract for the subscription services. This contract can be presented in "PDF" format or another format that can permit an appropriate electronic signature to be obtained. The contract can be printed by the user or e-mailed to the user separately, with confirmation of engagement of the subscription services.

It is contemplated that the user could perform all the steps mentioned above from a client device on a first network which in turn communicates with the server that is in communication with either the first network or a second network that is in communication with the first network. The present method can be performed using any number of networks simultaneously.

It is contemplated that a client device can include a cellular telephone, a laptop computer, a desktop computer, an I-phone™, a palm computer, or other similar devices.

In an embodiment, the server on the network can communicate to two client devices of a user simultaneously through two different gateway protocols, such as for use in classroom situations where students have different types of client devices, and writing a book using the website constitutes a segment of a student's curriculum.

Contemplated gateway protocols can include a Megaco/H.248 protocol, a simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

Use of two gateway protocols simultaneously enables a teacher at one institution to reach many student subscribers simultaneously and to use the website as a teaching tool in a curriculum, without imposing an extra cost to the students. Each student can use any electronic device the student already possesses. For example, students of all ages often possess cellular telephones but may not have laptop computers at home. Thus, the present method enables writing skills to be taught in all areas, and can include students of all ages, education levels, geographic areas, and economic situations, which is a significant benefit of the present method over any existing method.

Once the subscriber has made payment for the services for a defined period of time and a contract has been electronically executed, the subscriber can be allowed to perform the steps to create the book using the processor and the dynamic information database.

Once a user has become a subscriber, the administrator of the method can create an account having an account code, which can be stored in the dynamic information database and is unique to the subscriber. In an embodiment, the processor can also automatically generate an account and account code for a user that becomes a subscriber. The account code enables the subscriber to access all the information in the dynamic information database that is public, but not private information of other subscribers, such as other subscriber account codes, payment information, or work in progress. It is contemplated that subscribers can selectively make individual items of created text, artwork, characters, and contact information publicly available to other subscribers.

In an embodiment, it is contemplated that a subscriber can be a single teacher at one school, and sub-account codes for students of the teacher can be created under the single teacher's master code, enabling the teacher to view all the work in progress of each of his or her students.

The master account and sub-account code process also enables reports to be generated to the teacher, showing logon times and durations for each sub-account holder, and enables the master account holder to insert customized prompts, such as emails, at predetermined time intervals, reminding students that they have not worked on their book today.

The method uniquely enables teachers to remotely manage student writing, which provides a tremendous benefit for online schools, that provide curriculums to students that need to participate in academic studies from home, or cannot regularly attend classes.

It is contemplated that the present method can be particularly useful for home-schooled students who lack a classroom or a group setting and require online education as well as printed materials.

Use of a master account with multiple sub-accounts can also be of particular use for a parent that wishes to monitor the internet use, writing activities, and content produced by his or her children.

Once the account, and/or sub-accounts are created, each subscriber can be transmitted a password by email, enabling each subscriber to login and access the subscriber's account. In the case of the sub-account holders, it is contemplated that the master account holder can receive each of the passwords as well, enabling the master account holder to fully access each sub-account holder's work, but providing security between sub-account holders to prevent stealing of ideas and plagiarism, which is rampant among internet based curricula. This security feature, with communal access by the master account holder, is a significant benefit of the present method.

A subscriber can then be allowed to view the various categories in the dynamic information database to inspire the writing of a book.

The categories in the dynamic information database can be security-coded by age group, such as for preventing a 12 year old girl from viewing more mature subject matter that may be appropriate to those 18 years of age or older. Categories can be grouped by age ranges, and the categories can have access restricted or controlled by the administrator, by the master account holder, or both, ensuring age appropriate art, text, and characters for each book writing event.

In addition, a choice, again controllable by the master account holder, will be presented to the subscriber to either (1) write a story into a template presented by the processor using computer instructions stored in the data storage, (2) hire a writer to write a story for the subscriber using contact information and a contract stored in the dynamic information database, or (3) use text existing in the dynamic information database to create a story, compliant with the rules associated with the use of the text existing in the dynamic information database.

If the subscriber desires to write text, the subscriber will be presented with a template for writing text, and the inserted text written by the subscriber can be stored in the dynamic information database associated with the subscriber's account or sub-account information.

If the subscriber selects prewritten text, the subscriber can be presented with a table of topics, which can be categorized and restricted for age appropriateness. The subscriber can scroll through the topics looking for text. Depending on the subscription agreement terms, the subscriber will be able to choose one or more of the prewritten texts for use in the book.

In an embodiment, the subscriber will be able to edit the prewritten text and insert unique names, such as the names of the subscriber's parents or children, to customize the story to an individual subscriber. The subscriber could also edit the text in its entirety, even though "prewritten text" has been selected.

It is also contemplated that the subscriber can be permitted to upload text from a client device to the dynamic information database for use and/or editing in the creation of a customized book. The uploaded text can have any format. In an embodiment, the uploaded text can be an image file, such as a PDF file obtained by scanning one or more pages of printed text. The image file can be converted into editable text using optical character recognition software.

If the subscriber commissions another third party author to draft a story, contact information and e-mail addresses can be presented to the subscriber. The number of authors listed and the experience of these authors can vary depending on the subscription fee paid by the subscriber. For example, J. K. Rowling might cost $10,000 in subscription fees, but a lesser known author of children's books, such as Phyllis Johnston, might only cost $1,000 in subscription fees. In an embodiment, subscribers can be contracted by other subscribers to draft stories.

Once text has been created, the text can then be stored in the data storage, linked to the subscriber's account number. This storage is available 24 hours a day, 7 days a week, which enables the present method to be used by individuals in differing time zones, such as students in a planetary classroom situation, reaching students all over the planet simultaneously.

Background art is then presented to the subscriber to illustrate the book. This art can be presented in much the same way as the text is presented. The subscriber can be offered age appropriate choices, which can be controlled by the administrator, the master account holder, or both for illustrating the text.

Additionally, choices regarding placement of the art can also be offered, such as cover art, art behind text, art next to text, or art around the text.

Characters can be presented to the subscriber in the same manner as the background art.

For example, the administrator of the present method may have a selection of 150 possible characters to use in stories of subscribers, with hair colors, eye colors, clothing colors, and "personality" characteristics. For example, "Emily" may be a very quiet child, who moves slowly, "Betty" might be in a wheelchair and yet very animated and happy, and "Bobby" could be smiling all the time, sing, have blue eyes and red hair, and bounce as an animated character.

In an embodiment, it is contemplated that a module can be used that permits the subscriber to select an already-created character having random or assigned character attributes, such as eye color, hair color, or clothes. Character attributes can be assigned using drop down selection boxes.

Once the character is selected, text is written, and art is selected, the subscriber can be given the option of printing all or portions of the created book on the subscriber's printer, or using a printer designated by the subscriber.

When creating a book, it is contemplated that the subscriber can be presented with an icon asking if a table of contents should be created for the ongoing work, and inserted into the materials. In a contemplated embodiment, the free tour can also present a table of contents for a book to a user, to suggest a book having a plurality of short stories.

In yet another embodiment, it is contemplated that uploaded art work can be classified by artist name, by type of work, by date, or by a range of dates on which the work was created, uploaded, or both.

In an embodiment of the method, it is contemplated that one or more characters, artwork, or text can be used in more than one book of a subscriber, depending on the payment and level of subscriber services. For example, a silver, gold, and platinum level of subscriber services can cost $100, $1,000, and $10,000 a year, respectively, each level having different access features, different use restrictions, and different access to artists and authors. It is also contemplated that there can be an elementary school level, a middle school level, a high school level, and a college level, each having a different price per student based on the differing needs of each type of student or user.

In still another embodiment, it is contemplated that the artwork in the dynamic information database can include clip art, stock photos, stock artwork, or commissioned work of mixed media, photographs, art, electronic art, or combinations thereof.

Yet another embodiment of the method contemplates that the pricing for each type of artwork can differ based on the type of artwork presented.

Another embodiment of the method contemplates presenting scrolling messages, sponsor links, sponsor information, or combinations thereof to subscribers, users, and combinations thereof. These scrolling messages, in the case of users, can be advertisements. The scrolling messages, in the case of subscribers, can be messages about the provided services themselves, advertisements, or promotions of certain artists or authors for use in writing the books. It is also contemplated that certain authors can act, for a fee, as editors of works of a subscriber. Other subscribers can also be contracted to act as editors.

The method also contemplates that individual subscribers can create categories within their account to store art, characters, titles, text, and other materials by genre.

It is also contemplated that a created book can be transmittable by a subscriber to a secondary printer for perfect binding.

In an embodiment, it is contemplated that the outline of the book can look like the outline of a leather bound old book. Other outline designs, such as paperback books, hardcover books, cloth-bound books, encyclopedia volumes, and similar outline appearances can also contemplated.

In another embodiment, it is contemplated that the addition of text on a page can include filling an entire page, or just inserting three or four sentences into any number of pages.

It is contemplated that the contextual background can include artwork like clouds, birds, sun, trees, houses, or interior building images which accompany the text.

It is also contemplated that the fees paid by the subscriber can be set fees or sliding fees, depending on the number of prints desired of the book. Fees can include one set of fees for the website use, and an additional set of fees for non-website use. Fees can also be used for the outright purchase of artwork.

Referring now to FIG. 1, depicting an embodiment of a welcome page for the website, viewable by subscribers of the present method.

The welcome page includes a welcome message (14), which can identify the website and describe one or more services offered. Information relating to pre-contracted artists, writers, editors, or animators, can also be included. It is also contemplated that the welcome message (14) can include one or more advertisements.

A search window (16) is depicted beneath welcome message (14). Search window (16) is contemplated to be used for searching the dynamic information database of the website for both literary and visual works. Search window (16) includes a visual works button (18), which is contemplated to link to an input for receiving search terms for searching the visual works of the dynamic information database. Search window (16) also includes a literary works button (20), which is contemplated to link to an input for receiving search terms for searching literary works of the dynamic information database in a similar manner.

It is contemplated that visual works button (18), literary works button (20), or combinations thereof can also be input fields for receiving search terms, drop-down menus, links to one or more sections of the dynamic information database, or function as or be linked to other similar tools for searching the dynamic information database.

The welcome page is also depicted having a "Most Viewed" window (22), which lists the three works from the website that have been viewed the greatest number of times in the current day. It is contemplated that the "Most Viewed" window (22) can list a single work, or any number of works, in the order of greatest to least number of views, in a random order, or in any other order. In an embodiment, the "Most Viewed" window (22) can be unconstrained by any time period, and can list a number of works having the largest number of views since the creation of the website. The "Most Viewed" window (22) can also list the works having the largest number of views for a different time period, such as a day, a week, a month, a year, or longer.

The "Most Viewed" window (22) is shown listing a first most viewed work (24*a*), a second most viewed work (24*b*), and a third most viewed work (24*c*). First most viewed work (24*a*), second most viewed work (24*b*), and third most viewed work (24*c*) can be text, artwork, completed books, or any other type of material stored in the dynamic information database. It is contemplated that the listed works can function as links to the related works in the dynamic information database.

The "Most Viewed" window also contains a first most viewed image (26*a*), a second most viewed image (26*b*), and a third most viewed image (26*c*). The displayed images can be images related to the most viewed works (24*a*, 24*b* and 24*c*), or the displayed images can be separate images of visual works. For example, the most viewed works (24*a*, 24*b* and 24*c*) can include the three most viewed literary works on the website, while the most viewed images (26a, 26b and 26c), can include the three most viewed visual works on the website.

FIG. 1 also depicts the welcome page having a "New Uploads" window (28). "New Uploads" window (28) is contemplated to list a number of works from the website that have been recently uploaded. The "New Uploads" window (28) can list the most recently uploaded works to the dynamic information database in reverse chronological order, in random order, or in another order. The "New Uploads" window (28) can list any number of works, such as the three most recently uploaded works, or every work uploaded within the past week, independent of the number of works.

"New Uploads" window (28) is shown listing a first newly uploaded work (30a), a second newly uploaded work (30b), and a third newly uploaded work (30c). The newly uploaded works (30a, 30b and 30c) can be any type of work including text, images, completed books, or other material stored in the dynamic information database. "New Uploads" window (28) is also shown having a first newly uploaded image (32a), a second newly uploaded image (32b), and a third newly uploaded image (32c). The newly uploaded images (32a, 32b and 32c) can relate to the newly uploaded works (30a, 30b and 30c), or the newly uploaded images (32a, 32b and 32c) can relate to independent visual works.

The welcome page is further depicted having a "Member Log In" window (34), which is contemplated to include fields for receiving subscriber input to allow the subscriber to log into the website and view materials in the dynamic information database.

"Member Log In" window (34) includes a user name input (36), for receiving the account name of a subscriber. "Member Log In" window (34) also includes a password input (38), for receiving the password of the subscriber. Completion of the user name input (36) and the password input (38) is contemplated to allow the subscriber to log into the website and access the dynamic information database.

"Member Log In" window (34) is also depicted having a "Remember Me" option (40), which is shown including a box that can be selected to allow the website to recognize the computer currently logging into the website, such as by creating a log including the internet protocol (IP) address of the client device used to access the website. It is contemplated that use of the "Remember Me" option (40) can enable a user to be automatically logged into the website when accessing the website using the same client device.

A "Register Today" button (42) is also depicted in the "Member Log In" window (34). "Register Today" button (42) is contemplated to allow a user who is not yet a subscriber to be linked to a screen or electronic form for receiving information input by the user, such as user contact information and payment information.

"Member Log In" window (34) also contains a "Forgot my password" link (44), which can be selected if a subscriber has forgotten his or her user name or password and is unable to log in. It is contemplated that use of "Forgot my password" link (44) can require a subscriber to enter one or more items of the subscriber's contact information to verify the subscriber's identity. In an embodiment, the processor can generate a new user name, a new password, or combinations thereof and communicate the new user name or password to the subscriber, such as via e-mail.

"Member Log In" window (34) further contains a "Refer a friend" input (46), which is contemplated to receive input from a user or subscriber, such as an e-mail address of a third party, allowing the third party to be contacted by the website, such as via an automated e-mail, inviting the third party to visit the website and explore the services provided.

FIG. 1 also depicts the welcome page having a "Free Tour" button (48), which is contemplated to begin a tour of the website and a demonstration of many of the services provided.

The welcome page is also depicted having an "Add to Favorites" button (50), which is contemplated to automatically add the website address to the list of favorite websites stored in the user or subscriber's internet browser when selected.

The welcome page can also include one or more online advertisements (52), which can include scrolling messages, links, separate windows containing product or service information, and other types of advertisements. Online advertisements (52) can include third party advertisements, information regarding authors, editors, animators, and artists available for commissioned work through the website, descriptions of one or more services available through the website, and other types of advertisements.

Referring now to FIG. 2, an embodiment of a page from a created unique customized book using the services provided by the present method is shown.

The page depicted in FIG. 2 includes a book outline (54). Book outline (54) can include any type of shape or decoration surrounding the contents of the page. For example, book outline (54) can have the shape of an open book, a closed book, a polygon, or any article, object, or person. Book outline (54) can include graphic coloring, texturing, shadowing or combinations thereof. For example, book outline (54) could have the appearance of an old, leather-bound book.

Book outline (54) is shown containing text (56) on the left side of book outline (54). It is contemplated that text (56) can be any type of pre-created text selected from the dynamic information database, customized text composed by the subscriber, or commissioned text composed by a contracted author. Text (56) can be located anywhere within or adjacent to book outline (54). Text (56) can have any font or coloring and can be in any language.

Book outline (54) is also depicted containing artwork (58), which is depicted as an image of three children playing musical instruments to accompany text (56). While artwork (58) is depicted on the right side of book outline (54), adjacent text (56), artwork (58) can also be located behind text (56), around text (56), or anywhere within or adjacent to book outline (54). Artwork (58) can be any type of color or black-and-white image, including pre-created images stored in the dynamic information database, customized images drawn or scanned by the subscriber, or commissioned artwork created by a contracted artist. If the depicted page is viewed electronically, artwork (58) can also be animated. The scanned images can be scanned as PDF files, or can be scanned for individual character recognition and stored in data storage, enabling a subscriber to later edit the scanned-in work at their discretion.

Figure 3:
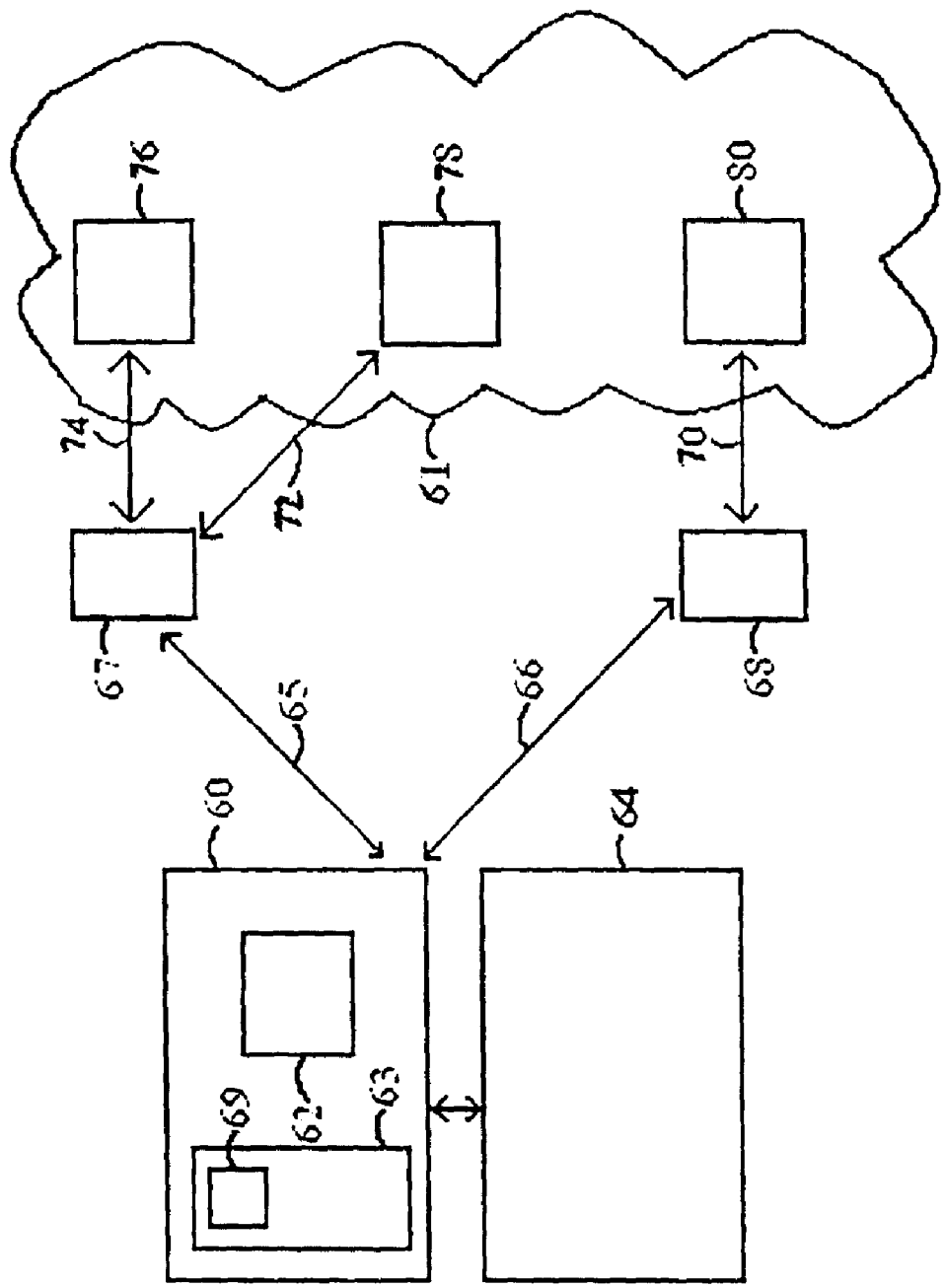
FIG. 3 depicts the system usable by the method for communicating with a writer via a network.

Referring now to FIG. 3, an embodiment of a system useable by the present method for communicating with a user or subscriber via a network is shown.

A server (60) having a processor (62) is shown in communication with a dynamic information database (64). While a single processor (62) is shown within server (60), server (60) can have any number of processors and can also be in remote communication with one or more processors. While server (60) is shown in remote communication with dynamic information database (64), dynamic information database (64) can also be stored in data storage (63) contained within server (60), such as a fixed data storage device or a removable data storage device. Data storage (63) is also shown containing computer instructions (69) for instructing processor (62) to perform the steps of the present method.

FIG. 3 also depicts a first network (61), which can be any type of network, including the internet. A first client device (76), a second client device (78), and a third client device (80) are shown in communication with first network (61). Each client device (76, 78 and 80) can be the same type of client device or different types of client device, and each client device (76, 78 and 80) can be associated with a single user, or multiple users. For example, first client device (76) can be a subscriber's laptop computer, while second client device (78) is the same subscriber's cellular telephone. Third client device (80) can be the same subscriber's desktop computer. Each client device (76, 78 and 80) could also be a computer, cellular telephone, or similar client device associated with respective individual users.

Server (60) is shown in communication with first client device (76) and second client device (78) via network (61) using a first gateway protocol (67). Server (60) communicates with first gateway protocol (67) via a first two-way communication (65), with first client device (76) via a fifth two-way communication (74), and with second client device (78) via a fourth two-way communication (72).

Server (60) is shown in communication with third client device (80) via network (61) using a second gateway protocol (68). Server (60) communicates with second gateway protocol (68) via a second two-way communication (66) and with third client device (80) via a third two-way communication (70).

It is contemplated that server (60) can communicate with each client device (76, 78 and 80) via both gateway protocols (67 and 68) individually or simultaneously.

Figure 4:
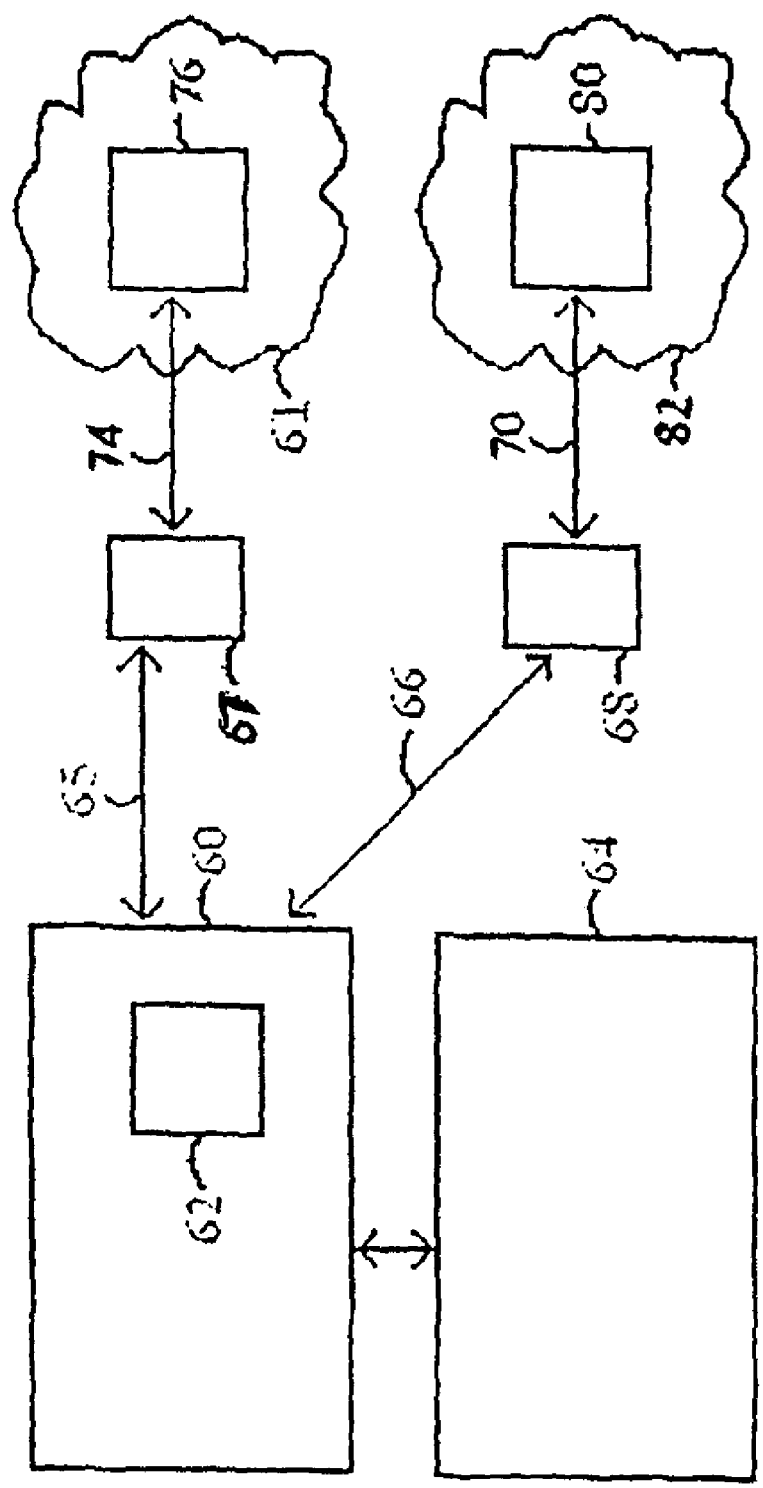
FIG. 4 depicts an alternate embodiment of a system useable by the method for communicating with a writer via two networks.

Referring now to FIG. 4, an alternate embodiment of a system useable with the present method is shown, for communicating with a user or subscriber via two networks.

Server (60) having processor (62) is shown in communication with dynamic information database (64). First client device (76) is shown in communication with first network (61). Third client device (80) is shown in communication with second network (82).

Server (60) is depicted in communication with first client device (76) via first network (61) through first gateway protocol (67). Server (60) is shown communicating with first gateway protocol (67) via first two-way communication (65), and with first client device (76) via fifth two-way communication (74).

Server (60) is depicted in communication with third client device (80) via second network (82) through second gateway protocol (68). Server (60) is shown communicating with second gateway protocol (68) via second two-way communication (66), and with third client device (80) via third two-way communication (70).

While FIG. 4 depicts a first and second network (61 and 82), server (60) can be in communication with any number of client devices via any number of networks. Further, while FIG. 4 depicts server (60) in communication with first network (61) through first gateway protocol (67), and with second network (82) through second gateway protocol (68), server (60) can communicate with a single network through any number of gateway protocols, and can communicate with any number of networks through a single gateway protocol.

While these embodiments have been described with emphasis on the embodiments, it should be understood that within the scope of the appended claims, the embodiments might be practiced other than as specifically described herein.

What is claimed is:

1. A method for creating a book having at least one story using a network, comprising the steps:

using a processor in communication with a data storage and a network to create a website to entice a user to subscribe to a subscription service, wherein the website presents the subscription service providing access to story writing services and book creation services that enables the user to create the book having at least one story;

using computer instructions stored in the data storage to:
offer a search tool to the user to browse a dynamic information database comprising: at least one artwork category, at least one text category, at least one character category, at least one contact information category on artists to provide commissioned art works, at least one contact information category on authors to provide commissioned written works, and at least one rules of usage category comprising rules for use of artwork, text, characters, or contact information; and
allow the user to become a subscriber and create the book having at least one story during a subscription period;

allowing the subscriber to create text for the book having at least one story by:
using computer instructions stored in the data storage to allow the subscriber to select to write the at least one story into a template stored in the data storage;
using computer instructions stored in the data storage to allow the subscriber to use text from the at least one text category to create the at least one story; and
using computer instructions stored in the data storage to allow the subscriber to hire a third party writer to write the at least one story using contact information from the at least one contact information category on authors;

storing the created text in the data storage;

presenting artwork to the subscriber from the at least one artwork category;

allowing the subscriber to select artwork from the at least one artwork category for use with the created text;

allowing the subscriber to choose placement of the selected artwork for the book having at least one story;

presenting characters to the subscriber from the at least one character category;

allowing the subscriber to select characters from the at least on character category for use in the book having at least one story; and using computer instructions stored in the data storage to store selections and work of the subscriber in the data storage under an account.

2. The method of claim 1, further comprising using computer instructions stored in the data storage to provide a free tour of the subscription service, wherein the computer instructions for providing the free tour comprise computer instructions for instructing the processor to:

offer an outline of the book on a defined group of pages to the user;

automatically generate and provide text on at least one page of the defined group of pages to the user;

provide contextual background artwork for the outline of the book on the at least one page of the defined group of pages to the user;

provide a visual image of at least one character on the at least one page of the defined group of pages to the user; and present a title for the outline of the book viewable by the user on or near a first page of the defined group of pages.

3. The method of claim 1, further comprising presenting the subscriber with an icon asking if a table of contents should be created and inserted into the book having at least one story or into a book with more than one story, and using the computer instructions to present the table of contents for the book having at least one story or the book with more than one story.

4. The method of claim 1, wherein the artwork, the text, or combinations thereof is viewable by individual, by type of work, by date, or by a range of dates.

5. The method of claim 1, further comprising using computer instructions to permit the subscriber to:
   insert electronically artwork, text, or combinations thereof, scanned by the subscriber to the account;
   post and/or provide artwork, text, and animation to other subscribers;
   store produced artwork, text, and animation in the dynamic information database; and
   make stored produced artwork text, and animation in the dynamic information database accessible and useable by other subscribers.

6. The method of claim 5, further comprising using computer instructions to instruct the processor to:
   present icons on the website to subscribers offering use of artwork, text, or combinations thereof posted by other subscribers; and
   present icons on the website to subscribers offering use of artwork, text, or combinations thereof posted by pre-contracted authors, artists, or animators.

7. The method of claim 1, wherein contract templates for use in commissioning writers, artists, or combinations thereof are stored in the dynamic information database.

8. The method of claim 7, wherein fees for use in commissioning are linked to the contract templates, pricing of artwork differs based on the type of artwork presented, or combinations thereof.

9. The method of claim 1, further comprising using the computer instructions to provide to the subscriber a complete editable story.

10. The method of claim 1, further comprising allowing the subscriber to categorize at least portions of subscriber created and subscriber selected books, artwork, characters, titles, and text by genre.

11. The method of claim 1, further comprising:
    allowing the subscriber to print at least a portion of the book having at least one story on a printer, wherein the book having the at least one story is formatted for printing;
    permitting a completed book to be transmitted to a bindery for perfect binding; or
    combinations thereof.

12. The method of claim 1, further comprising:
    allowing the subscriber to create a customized title; or
    presenting a listing of pre-created titles on the website and allowing the subscriber to select one of the pre-created titles.

13. The method of claim 1, wherein the search tool is offered by presenting a search window on the website, wherein the search window comprises:
    a visual works button linked to an input for receiving search terms for searching visual works within the dynamic information database; and
    a literary works button linked to an input for receiving search terms for searching literary works within the dynamic information database.

14. The method of claim 13, wherein the visual works button and the literary works button comprise: input fields for receiving search terms, drop-down menus, links to sections of the dynamic information database, or links to tools for searching the dynamic information database.

15. The method of claim 1, further comprising using computer instructions stored in the data storage to:
    provide a welcome message to the user on the network enticing the user to create at least one customized book;
    provide a security feature to the user;
    offer briefly to the user recently viewed works and images with a high viewing frequency;
    offer to the user works and images recently uploaded to the dynamic information database; or
    combinations thereof.

16. The method of claim 1, wherein:
    the at least one artwork category comprises: customized images, preexisting images, artwork from an administrator, artwork from subscribers, artwork from third parties, clip art, stock photographs, stock artwork, commissioned works of art, background art, cover art, mixed media, photographs, art, electronic art, color images, black and white images, images drawn or scanned by subscribers, animated artwork, or combinations thereof;
    the at least one text category comprises: customized text, preexisting text, text from the administrator, text from subscribers, text from third parties, commissioned text, or combinations thereof; and
    the at least one character category comprises: already created characters, customized characters, animated characters, or combinations thereof.

17. The method of claim 1, wherein:
    using the computer instructions stored in the data storage to allow the subscriber to select to write the at least one story into the template stored in the data storage comprises:
        presenting the template to the subscriber; and
        allowing the subscriber to inset text into the template, allowing the subscriber to upload text to the dynamic information database for use in the at least one story, or combinations thereof;
    using the computer instructions stored in the data storage to allow the subscriber to use text from the at least one text category to create the at least one story comprises:
        presenting a table of topics and allowing the subscriber to select text from the at least one text category for use in the at least one story; and
        allowing the subscriber to edit the text from the at least one text category to customize the at least one story; or
    combinations thereof.

18. The method of claim 1, further comprising:
    allowing the subscriber to create a master account with a master code, wherein the subscriber is a master account holder;
    allowing the master account holder to create sub-accounts with sub-account codes for sub-account holders; and
    enabling the master account holder to access and view all work in progress of each sub-account.

19. The method of claim 18, further comprising:
    enabling reports to be generated to the master account holder, wherein the reports comprise logon times and durations of each sub-account;
    enabling the master account holder to insert customized prompts at predetermined time intervals into the sub-accounts;

enabling the master account holder to manage writing of the sub-accounts;

providing security between each sub-account to prevent plagiarism between sub-accounts;

allowing the master account holder to control a choice of the sub-account holders, wherein the choice is between: writing a story into a template presented by the processor using computer instructions stored in the data storage, hiring a writer to write a story using contact information and a contract stored in the dynamic information database, and using text existing in the dynamic information database to create a story compliant with the rules associated with the use of the text existing in the dynamic information database;

allowing the administrator, the master account holder, or combinations thereof to control age appropriate choices offered to the sub-account holders; or combinations thereof.

20. The method of claim 18, wherein:

the master account holder is a teacher and the sub-account holders are students of the teacher;

the master account holder is a teacher at an online school and the sub-account holders are students of the teacher at the online school;

the master account holder is a parent and the sub-account holders are the parent's children; or the master account holder is a parent or teacher and the sub-account holders are home-schooled students.

* * * * *